US008837707B2

(12) United States Patent
Yasrebi et al.

(10) Patent No.: US 8,837,707 B2
(45) Date of Patent: *Sep. 16, 2014

(54) AUTOMATIC INTEGRATED ESCALATION IN A UNIFIED MESSAGING SYSTEM

(71) Applicant: AT&T Intellectual Property I, L.P., Atlanta, GA (US)

(72) Inventors: Mehrad Yasrebi, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 38 days.

This patent is subject to a terminal disclaimer.

(21) Appl. No.: 13/762,634

(22) Filed: Feb. 8, 2013

(65) Prior Publication Data

US 2013/0148795 A1      Jun. 13, 2013

Related U.S. Application Data

(63) Continuation of application No. 12/582,374, filed on Oct. 20, 2009, now Pat. No. 8,396,203.

(51) Int. Cl.
*H04M 3/00* (2006.01)
*H04M 3/53* (2006.01)
*H04L 12/58* (2006.01)
*H04M 15/06* (2006.01)
*H04L 12/24* (2006.01)

(52) U.S. Cl.
CPC .......... *H04M 3/5307* (2013.01); *H04L 51/14* (2013.01); *H04M 15/06* (2013.01); *H04L 12/589* (2013.01); *H04L 12/5855* (2013.01); *H04L 41/5064* (2013.01)
USPC .................................. 379/265.01; 379/88.22

(58) Field of Classification Search
None
See application file for complete search history.

(56) References Cited

U.S. PATENT DOCUMENTS

| 5,287,498 | A | 2/1994 | Perelman et al. |
|---|---|---|---|
| 5,966,351 | A | 10/1999 | Carleton et al. |
| 6,011,792 | A | 1/2000 | Miloslavsky |
| 6,438,215 | B1 * | 8/2002 | Skladman et al. ........... 379/67.1 |
| 6,442,250 | B1 | 8/2002 | Troen-Krasnow et al. |
| 6,442,592 | B1 * | 8/2002 | Alumbaugh et al. ......... 709/206 |
| 6,633,630 | B1 | 10/2003 | Owens et al. |
| 7,212,617 | B2 | 5/2007 | Owens et al. |
| 7,251,495 | B2 | 7/2007 | Keyani et al. |

(Continued)

OTHER PUBLICATIONS

U.S. Appl. No. 12/568,714, filed Sep. 29, 2009, entitled "System and Method for Handling Call Redirections in a Voice Messaging System", 17 pp.

(Continued)

*Primary Examiner* — Duc Nguyen
*Assistant Examiner* — Assad Mohammed
(74) *Attorney, Agent, or Firm* — Wolff & Samson PC

(57) ABSTRACT

A user is identified based at least in part on a user identification designation associated with an incoming communication. A message recipient is then determined based at least in part on the identified user and one or more address books associated with message recipients by comparing the user identification designation to one or more entries in the one or more recipient databases. The incoming communication is routed to the determined message recipient. Escalation procedures are implemented up to a configured level in the recipient organization based on various criteria. As messages are escalated and deposited in mailboxes associated with the determined message recipients, the determined message recipients are notified of the deposited messages.

20 Claims, 6 Drawing Sheets

(56) References Cited

U.S. PATENT DOCUMENTS

| | | | |
|---|---|---|---|
| 7,292,689 | B2 | 11/2007 | Odinak et al. |
| 7,370,278 | B2 * | 5/2008 | Malik et al. .................. 715/758 |
| 2006/0010210 | A1 | 1/2006 | Keller |
| 2006/0210034 | A1 * | 9/2006 | Beadle et al. ............. 379/88.22 |
| 2007/0177717 | A1 | 8/2007 | Owen et al. |
| 2008/0144804 | A1 * | 6/2008 | Mergen ..................... 379/266.1 |
| 2009/0106371 | A1 | 4/2009 | Schmidt-Karaca et al. |
| 2009/0129567 | A1 | 5/2009 | Jackson et al. |
| 2009/0156171 | A1 | 6/2009 | Yasrebi et al. |
| 2009/0180597 | A1 | 7/2009 | Jackson et al. |

OTHER PUBLICATIONS

U.S. Appl. No. 12/335,052, filed Dec. 15, 2008, entitled "Method and System for Managing Multiple Instance Subscriber Records in Unified Messaging Systems", 33 pp.

U.S. Appl. No. 12/335,021, filed Dec. 15, 2008, entitled "Method and System for Managing Changes in Organizational Data in Unified Messaging Systems", 27 pp.

U.S. Appl. No. 12/334,968, filed Dec. 15, 2008, entitled "Method and System for Automatically Defining Organizational Data in Unified Messaging Systems", 20 pp.

U.S. Appl. No. 12/123,996, filed May 20, 2008, entitled "System and Method of Controlling a Messaging System", 34 pp.

U.S. Appl. No. 12/568,714, filed Sep. 29, 2009, entitled "System and Method for Handling Call Redirections in a Voice Messaging System".

U.S. Appl. No. 12/335,052, filed Dec. 15, 2008, entitled "Method and System for Managing Multiple Instance Subscriber Records in Unified Messaging Systems".

U.S. Appl. No. 12/335,021, filed Dec. 15, 2008, entitled "Method and System for Managing Changes in Organizational Data in Unified Messaging Systems".

U.S. Appl. No. 12/334,968, filed Dec. 15, 2008, entitled "Method and System for Automatically Defining Organizational Data in Unified Messaging Systems".

U.S. Appl. No. 12/123,996, filed May 20, 2008, entitled "System and Method of Controlling a Messaging System".

* cited by examiner

AUTOMATIC INTEGRATED ESCALATION IN A UNIFIED MESSAGING SYSTEM

This application is a continuation of U.S. patent application Ser. No. 12/582,374, filed on Oct. 20, 2009, which is incorporated by reference herein.

BACKGROUND

The present disclosure relates generally to message routing and more particularly to automatic escalation in a unified messaging platform environment.

Unified messaging is the integration of different streams of communication (e.g., email, voicemail, short message service (SMS), fax, etc.) into a single, unified message store (e.g., a unified messaging platform) accessible from a variety of user devices.

Call centers are centralized offices used for the purpose of receiving and transmitting large volumes of requests by telephone or other communication devices. Call centers are used to receive incoming communication (e.g., audio calls, video calls, emails and faxes) to an organization (e.g., a company, corporation, business unit, etc.). For example, call centers may be used as a customer service center staffed by multiple customer service representatives (CSRs). Each representative may be responsible for one or more customer accounts and/or types of customer issues (e.g., account termination, maintenance, billing disputes, etc.).

However, a call center is generally associated with a single telephone number or a limited number of telephone numbers. That is, an organization may have a customer service number (e.g., 1-800-CUSTOMR) that all customers call, regardless of the reason for calling. Incoming calls are then routed based on operator routing, hierarchical customer service representative response, automated speech recognition systems, or the like. If a particular customer service representative responsible for the incoming call is unavailable, the customer may be invited to leave a message in the form of a voicemail, such as in the system described in co-pending and concurrently filed U.S. patent application Ser. No. 12/582,263, entitled "Message Routing in a Unified Messaging System".

In a unified messaging platform environment, other communications methods, such as email and facsimiles, are also used to contact customer service representatives. In call centers using a single or limited incoming telephone numbers, these emails and facsimiles may be deposited along with the voicemails as described above.

Customers who have sent voice, facsimile, emails and/or other messages for a particular customer service representative may experience poor quality of service when the customer service representative is unavailable for a significant period or if the customer's needs are urgent. That is, the customer may not receive a timely response to their message because the message has not been received by any customer service representative.

BRIEF SUMMARY

The present disclosure relates generally to message handling and more particularly to message handling in a unified messaging platform environment.

In one embodiment, a user is identified based at least in part on a user identification designation associated with an incoming communication. A message recipient is then determined based at least in part on the identified user and one or more databases and/or address books associated with message recipients by comparing the user identification designation to one or more entries in the one or more recipient databases and/or address books. The user is associated with one of a plurality of message recipients according to a predetermined or random assignment algorithm if no prior association is determined. The incoming communication is routed to the determined message recipient.

A message for a live communication attempt (e.g., voice call) is deposited in a mailbox associated with the determined message recipient if the determined message recipient is not available. Other (non-live) communication messages (such as email and facsimile) are deposited into the recipient's mailbox. Only the determined message recipient may be notified of the deposited message. In certain circumstances, such as when an intended original recipient is not available or does not handle such a deposited message, each such deposited message may be further routed to other appropriate recipients based on the embodiments being disclosed in the following.

These and other advantages of the disclosure will be apparent to those of ordinary skill in the art by reference to the following detailed description and the accompanying drawings.

DETAILED DESCRIPTION

Figure 1:
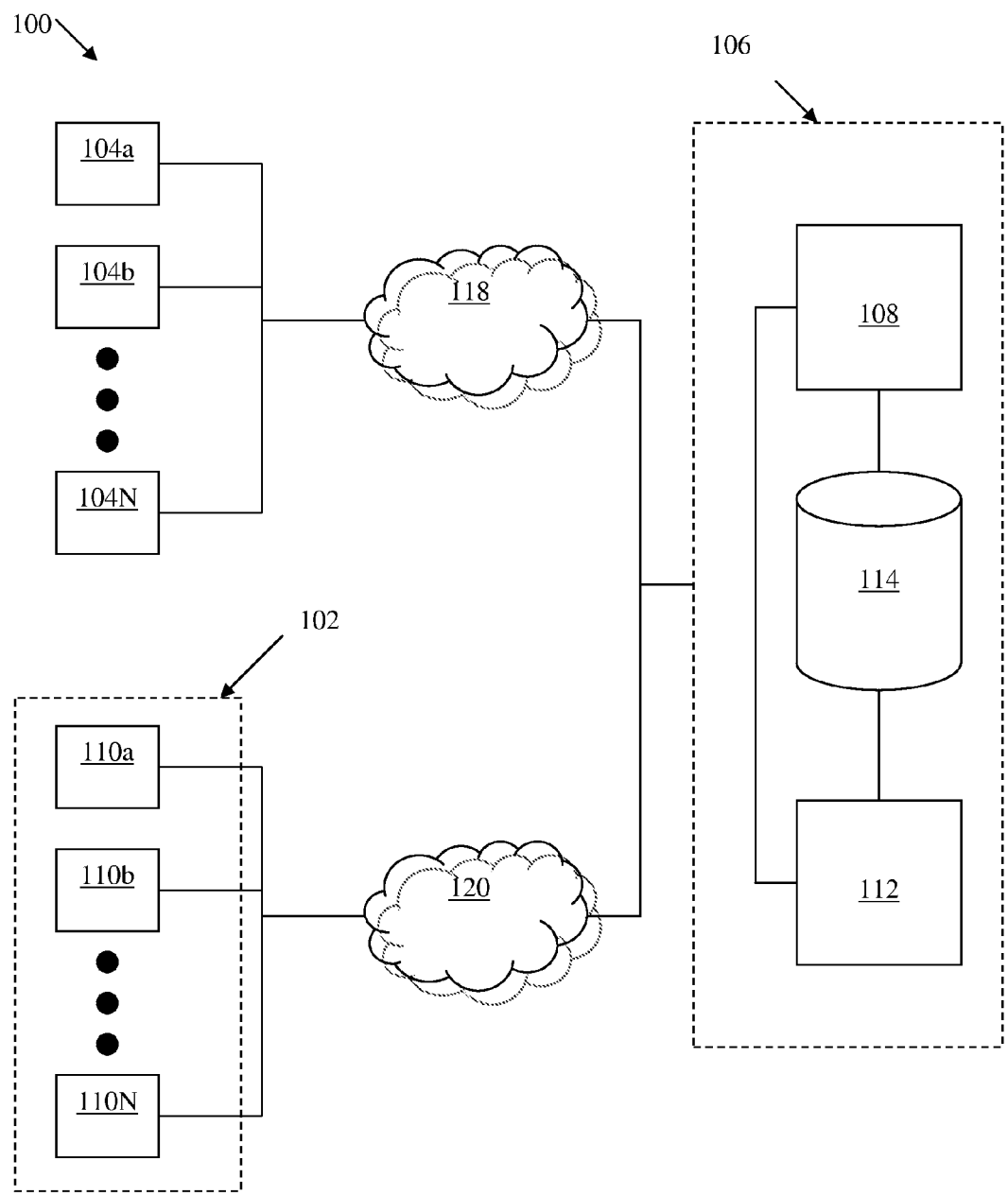
FIG. 1 depicts a unified messaging system according to an embodiment of the present disclosure.

FIG. 1 depicts a calling system 100 according to an embodiment of the present disclosure. Calling system 100, which may be used in unified messaging (UM), includes an exemplary call center 102 in communication with one or more customers 104a, 104b, ..., 104N and a UM platform 106.

Call center 102 includes one or more customer service representatives 110a, 110b, ..., 110N. In at least one embodiment, customers 104a-N are connected to, and/or are in communication with call center 102 and one or more customer service representatives 110a-N using communication network 108 and/or communication network 120. The designation N is used only to indicate multiplicity of numbers, and the number of customers 104a-N may be different than the number of customer service representatives 110a-N.

Customer service representatives (CSRs) 110a-N are in communication with UM platform 106, which includes UM interface 108, UM controller 112, and/or UM database 114. Communication between UM interface 108 and customer service representatives 110a-N may be controlled by a UM controller 112. UM controller 112 and/or UM interface 108 may also control and/or be in communication with UM database 114. As described herein, "in communication with" describes connection between components (e.g., customers 104a-N, UM interface 108, customer service representatives 110a-N, UM controller 112, UM database 114, etc.) that can transmit signals and/or information to each other using any appropriate protocol and combination of wired and/or wireless communication techniques (e.g., VOIP, wired, IP, etc.). In at least one embodiment, such communication may be through and/or with a telephone and/or packet network, as is known. For example, in some embodiments, CSRs 110a-N may communicate with (e.g., access) the UM platform 106 and their messages using telephone user interface (TUI) and/or one or more computer programs. Originators of voice or video calls that are not answered by any customer service representative 110a-N may choose to leave messages into the UM database 114 of the UM platform 106, as mediated by the UM interface 108 and UM controller 112. Other message types (for example, e-mail and facsimile messages) that may be addressed to the common customer service representatives 110a-N may also be deposited into the UM database 114 as managed by the UM controller 112 and/or UM interface 108.

Call center 102 and/or UM platform 106 may be constructed using any appropriate combination of physical components and special-purpose computers configured to carry out the specific functions described below. Additionally, various components of UM platform 106 may be combined and/or may have functionality split over various components. For example, UM interface 108 may include a database configured as UM database 114 and a controller configured as UM controller 112. In another example, UM controller 112 may be implemented in a program executed at a remote server that controls and routes calls and messages to UM interface 108 and/or customer service representatives 110a-N.

Customers 104a-N are users of the call center 102 using any appropriate communications device (e.g., telecommunications device, telephone, mobile telephone, email-capable device, facsimile machine, etc.) to communicate with call center 102 and/or customer service representatives 110a-N. UM platform 106 is based on a unified messaging system. As such, UM platform 106 supports voice, email, and facsimile message types in a unified fashion. For example, subscribers to (e.g., users of) UM platform 106, such as customer service representatives 110a-N of call center 102, may receive and deposit messages of any type in an associated mailbox or associate mailboxes of the UM platform 106. In this way, UM platform 106 is accessed via one or more networks (e.g., telephone, packet, etc.) to receive and handle messages based on incoming data. The UM platform may also initiate transmission of messages such as reminder messages.

UM interface 108 is any appropriate server or server-like device or devices that can receive information from customers 104a-N and can send information to and receive information from customer service representatives 110a-N and customers 104a-N. That is, UM interface 108 coordinates (e.g., receives and/or stores) communications from customers 104a-N who wish to access the call center 102 and customer service representatives 110a-N. In at least one embodiment, UM interface 108 includes a telephone user interface (TUI) program. In another embodiment, UM interface 108 may also include the communication capability to offer its users support for multimedia communication sessions to store video messages. UM interface 108 may be implemented as a computer, such as the computer 200 discussed below with respect to FIG. 2. That is, UM interface 108 may include and/or be a computer adapted to perform the methods described below with respect to FIGS. 4, 5 and 6. As described above, UM interface 108 may be coupled to or include UM controller 112 and/or UM database 114.

Customer service representatives 110a-N are local and/or remotely connected representatives of an organization (e.g., customer care representatives, call center support staff, etc.) using any appropriate communications device (e.g., telecommunications device, computer with communication software/firmware, telephone, mobile telephone, email-capable device, facsimile machine, etc.) to communicate with call center 102 and/or customers 104a-N.

UM controller 112 is any appropriate module that can send information to and receive information from UM interface 108, customers 104a-N, and customer service representatives 110a-N. That is, UM controller 112 coordinates communications between UM interface 108 and customer service representatives 110a-N in accordance with the methods described herein. In at least one embodiment, UM interface 108 may implement an application programming interface (API). In another embodiment, UM controller 112 may handle processing of messages such as recorded voice and/or vide calls, e-mails and facsimiles. In an alternative embodiment, UM controller 112 is a remote web server or similar device capable of performing the functions described below. In either embodiment, UM controller 112 may be implemented as a computer, such as the computer 200 discussed below with respect to FIG. 2. That is, UM controller 112 may include and/or be a computer adapted to perform the methods described below with respect to FIGS. 4 and 5.

Figure 3:
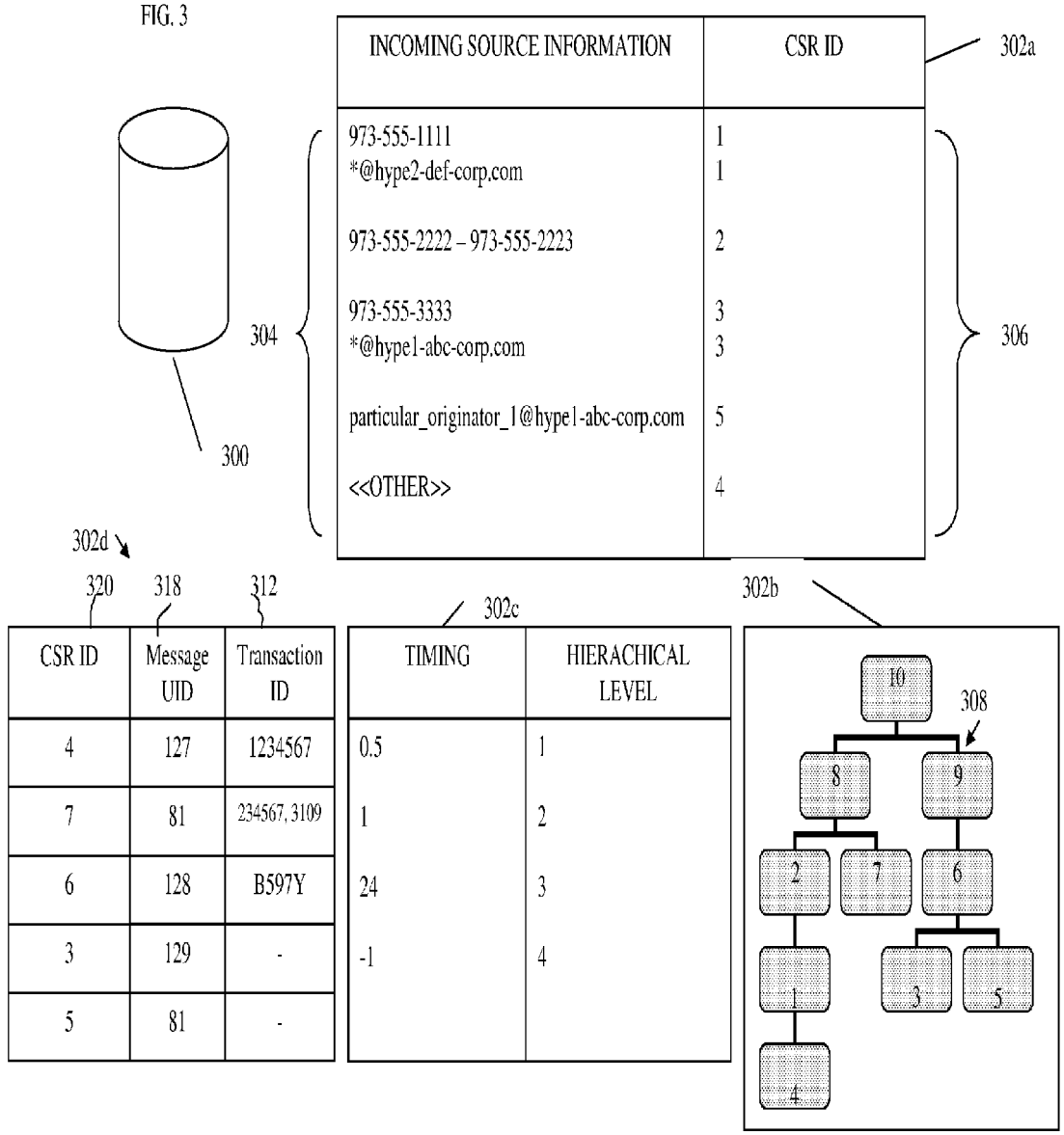
FIG. 3 depicts a database according to an embodiment of the present disclosure.

UM database 114 is any appropriate database, such as the database described below with respect to FIG. 3. In at least one embodiment, UM database 114 is a database that can contain data to correlate information (e.g., invoice number, telephone number, trouble ticket, etc.) related to customers 104a-N with an associated customer service representative 110a-N. The database 300 described below with respect to FIG. 3 is an example of the correlations and/or associations that may be used to implement the methods described below with respect to FIGS. 4 and 5. Portions of database 114 may be associated with or related to or used with one or more address books (not shown) of call center 102.

Communications to and/from UM platform 106 and customer service representatives 110a-N and customers 104a-N may be through the analog communication network 118 (e.g., one or more telephone networks) and/or packet communication network 120 (e.g., a private local area network, a private wide area network and/or the public network known as the Internet). The interface components of UM platform 106 to the analog communication network 118 and packet communication network 120 are not shown, but may be implemented as part of UM interface 108 in at least one embodiment. In at least one embodiment, email messages and multimedia (e.g., voice and/or data) can be transmitted through the packet communication network 120, and facsimile messages can be transmitted through the analog communication network 118 and/or packet communication network 120. Various communications components and network connections are not shown in FIG. 1, and are apparent to persons skilled in the art. Communication network 118 and communication network 120 may be implemented using any past, present and future protocols and such technologies would not be excluded from the scope of this present disclosure. For example, communication network 120 may be implemented using one or more protocols such as GSM, wimax, 802.11a, 802.11g, 802.11n, 802.3 Ethernet, leased lines, and other technologies. Communication network 118 and communication network 120 may each consist of one or more networks. For example, communication network 120 may include a GSM network for wireless communications to and from one or more customers 104a-N, one or more wired connections to one or more customers 104a-N, and have one or more wired connections to call center 102 and the customer service representatives 110a-N. Detailed components, such as possible additional networks and components associated with call center 102 and customers 104*a*-N are not shown.

Figure 2:
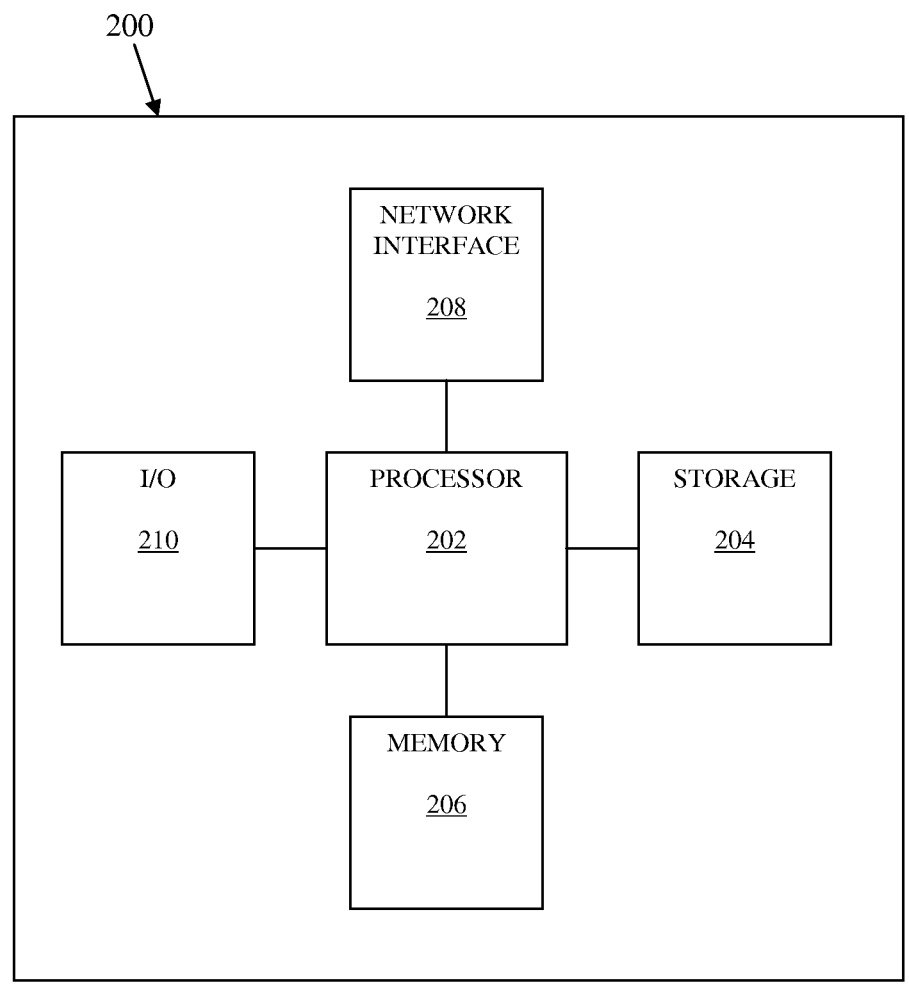
FIG. 2 is a schematic drawing of a computer.

FIG. 2 is a schematic drawing of a computer 200 according to an embodiment of the present disclosure.

Computer 200 contains devices that form a controller including a processor 202 that controls the overall operation of the computer 200 by executing computer program instructions, which define such operation. The computer program instructions may be stored in a storage device 204 (e.g., magnetic disk, database, etc.) and loaded into memory 206 when execution of the computer program instructions is desired. Thus, applications for performing the herein-described method steps, such as those described below with respect to method 400 are defined by the computer program instructions stored in the memory 206 and/or storage 204 and controlled by the processor 202 executing the computer program instructions. The computer 200 may also include one or more network interfaces 208 for communicating with other devices via a network. The computer 200 also includes input/output devices 210 that enable operator interaction with the computer 200. Computer 200 and/or processor 202 may include one or more central processing units, read only memory (ROM) devices and/or random access memory (RAM) devices. One skilled in the art will recognize that an implementation of an actual computer could contain other components as well, and that the computer of FIG. 2 is a high level representation of some of the components of such a computer for illustrative purposes.

According to some embodiments of the present disclosure, instructions of a program (e.g., controller software) may be read into memory 206, such as from a ROM device to a RAM device or from a LAN adapter to a RAM device. Execution of sequences of the instructions in the program may cause the computer 200 to perform one or more of the method steps described herein. In alternative embodiments, hard-wired circuitry or integrated circuits may be used in place of, or in combination with, software instructions for implementation of the processes of the present disclosure. Thus, embodiments of the present disclosure are not limited to any specific combination of hardware, firmware, and/or software. The memory 206 may store the software for the computer 200, which may be adapted to execute the software program and thereby operate in accordance with the present disclosure and particularly in accordance with the methods described in detail below. However, it would be understood by one of ordinary skill in the art that the present disclosure as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general purpose program elements are known to those skilled in the art, and need not be described in detail herein.

FIG. 3 depicts a database 300 according to an embodiment of the present disclosure. In at least one embodiment, database 300 is used as UM database 114 of FIG. 1. In an exemplary embodiment, database 300 includes one or more tables 302*a*, 302*b*, 302*c*. Tables 302*a*-*c* may include a list of incoming source information 304 (e.g., telephone numbers (TNs), email addresses, email domains, etc. associated with calling customers 104*a*-N, email addresses, etc.), an associated transaction identification number (transaction ID) 306 (e.g., invoice number, trouble ticket, etc.), an organizational chart 308, a hierarchical structure, a message response timing indication list (e.g., a list indicating a time until action if a message has not been acknowledged by a customer service representative, etc.), or any other appropriate list or structure. Database 300 may include other information (not shown) such as some data that may be used in the general operations of unified messaging platforms. Database 300 may be a flexible mapping database and may be configured (e.g., by a user of the call center 102).

Database 300 may be collection of data that is stored in a computer (e.g., computer 200 of FIG. 2) wherein a database management system (DBMS) may consult the database 300 to answer queries (e.g., to select data). Data retrieved in answer to queries become information that can be used to make decisions, may precipitate actions, or may be displayed to a customer service representative 110*a*-N.

For simplicity, database 300 is depicted and described in the embodiment of FIG. 3 as a relational database. In the same or alternative embodiments, all or part of database 300 may configured according to another database model such as a hierarchical model, a table model, a network model, an object model, an associative model, etc.

Data shown in FIG. 3 for database 300 be arranged and represented in any suitable fashion. For example, organization chart 308 may be represented graphically as a tree, but may be implemented as a table 302*b*. For example, in a tabular implementation each node of the shown organization chart 308 tree may represent a customer service representative 110*i* and be implemented by a row, where a column of that row may be used to refer to another customer service representative 110*k*, where customer service representative 110*k* would be represented by a tree node above (e.g., a supervisor or other customer service representative 110*i*). As an example, customer service representative 110*k* with a CSR ID value of 1 may be a superior of a customer service representative 110*i* with a CSR ID value of 4, as shown in the tree representation of the organization chart 308. Tables 302*a*-*d* may be data tables as is known in the use of databases. It is understood that any number of tables and/or relational charts may be used to store and correlate data. Similarly, though referred to as tables, tables 302*a*-*d* are a visual representation of a database relation and any appropriate implementation of data storage and correlation may be used. As such, tables 302*a*-*d*, especially those related to organizational chart 308, may be an address book or a portion of an address book, and may be used by customer service representatives 110*a*-N. Such address books may be address books of the call center 102, address books of external organizations (e.g., address books associated with customers 104*a*-N, etc.), or any combination thereof. Other data that is not shown may be stored in conjunction with the data shown in FIG. 3. The exemplary data that is shown in FIG. 3 is used to identify a first customer service representative 110*i* (among the customer service representatives 110*a*-N), where the customer service representative 110*i* is responsible for handling the incoming message.

Tables 302*a*-*d* may be a set of data elements organized using rows and columns which may be accessed via the DBMS (e.g., as in a look-up table). The columns may be identified by title (e.g., "Incoming Source Information" and "Transaction ID") or another identifier. The rows may be identified by the values (e.g., "973-555-1111", "1", "3", etc.) appearing in particular columns. In some embodiments rows may also have titles or other identifiers.

The list of incoming source information 304 may include data values associated with incoming messages to UM call center 102, such as those messages from customers 104*a*-N.

That is, incoming source information 304 may be a list of telephone numbers and/or email addresses of users who have previously contacted UM call center 102 or have some other prior association with UM call center 102. Accordingly, when UM call center 102 receives a call from a particular known source, UM database 300 may be accessed to determine any appropriate associations (e.g., associations of a message, based on its originator, with a particular customer service representative ID (CRS ID), association of particular customer service representatives 110a-N using organizational chart 308, address book information, etc.).

As discussed similarly in related U.S. patent application Ser. No. 12/582,263, entitled "Message Routing in a Unified Messaging System", tables 302a-d may include other appropriate information such as a information about each customer service representative 110a-N. Table 302a can be used to identify a specific customer service representative 110i using the incoming source information of an arrived message and the CSR ID 306 of that customer service representative 110i. For example, if a voice message is from a caller at number 973-555-3333, customer service representative 110i with CSR ID 306 with a value of 3 can be initially associated with that arrived message. As another example, UM platform 106 can associate an arrived email from particular_originator_1@hype1-abc-corp.com with a UM platform 106 subscriber customer service representative 110i with a CSR ID 306 with value of 5. Not all of the employees of the call center 102 may be initially associated with incoming messages by UM 102. For example, only 5 employees are listed in table 302a, whereas information about more employees are stored in the sample data for table 302b of call center 102. An incoming message, whose incoming source information is otherwise not specified in table 302a is associated with a customer service representative 110i, whose CSR ID is 4.

Tables 302b and 302c may be related in a hierarchical structure in that table 302b may provide further information about table 302a and table 302c may provide further information about table 302b.

In the exemplary embodiment of FIG. 3, table 302b may represent an organizational chart 308 as shown in FIG. 3. Such an organizational chart may be a representation of a partial or full hierarchical relationship of customer service representatives 110a-N in call center 102. For example, if a customer 104a-N associated with the incoming telephone number "973-555-1111" from the list of incoming source information 304 contacts UM call center 102, a customer service representative 110i with CSR ID 306 with a value of 1 can be initially associated with that arrived message. The information in organization chart 308 can be used by UM platform 106 to escalate handling of this message to other people (i.e., call center employees with CSR IDs of 2 and 8, in that order), when certain conditions are met. That is, as discussed below with respect to FIGS. 4 and 5, messages deposited in mailboxes associated with the customer service representatives 110a-N designated in organizational chart 308 may be escalated to other customer service representatives 110a-N according to a predetermined condition. In the sample organization chart 308 of table 302b, the CSR ID values of employees are stored for each employee. The level of each employee may also be stored in table 302b. For example each row of a tabular arrangement of table 302b can include (among other data) a column value for level of that employee and another column for the CSR ID of that employee. A total of 5 levels are shown for table 302b, where customer service representative with the CSR ID of 4 is at level 1, customer service representatives with CSR IDs of 1, 3 and 5 are at level 2, and so on. The employee (customer service representative 110i) with CSR ID of 10 is at level 5 in table 302b.

Information related to the escalations of messages among customer service representatives 110a-N with regards to their positioning in organizational chart 308 may be stored in table 302c. Table 302c may store information related to the length of time a message is stored in a particular mailbox before being escalated. For example, a message stored in a mailbox for a level "1" customer service representative 110a-N may be stored for 0.5 hours before being forwarded to the next available or next designated customer service representative 110a-N (e.g., the next higher customer service representative in organizational chart 308). Similarly, as shown in table 302c, a message stored in a mailbox for a level "2" customer service representative may be stored for 1 hour before being forwarded to the next available or next designated customer service representative 110a-N. In other words, different customer service representatives 110a-N and/or different levels of organizational chart 308 may be assigned different durations messages are held before being escalated to another customer service representative 110a-N. The timing value for employees at level 4 has a special value (−1 in the sample table 302c) to indicate that UM platform 106 must not escalate handling of incoming messages above level 4 under any circumstances.

Another table 302d of UM database 300 can be used to associate each message with zero or more transaction IDs 312. Each arrived message in a UM platform 106 is assigned a unique message UID 318 by UM system platform 106. Customer service representatives 110a-N may associate each message with zero or more transaction IDs 312. Transactions can be any information that may be maintained in the UM database 300 or another database (not shown) such as trouble tickets, invoices, or payments. Such transactions may be related to customers 104a-N or other events or information which may be internal to the call center 102. Other columns of table 302d include CSR ID 320 (equivalent to CSR ID 306). Other data in database 300 may be used to associate each CSR ID 306 (320) to the unique email address of each customer service representative 110a-N, as described in the co-pending and concurrently filed U.S. patent application Ser. No. 12/582,263, entitled "Message Routing in a Unified Messaging System". Each Customer service representative 110a-N can use the UM platform 106 to populate, modify, and/or delete one or more transaction IDs 312 for each message in his/her mailbox, after he/she accesses each message. Such transaction IDs 312 may be used to communicate additional information about messages between customer service representatives 110a-N, who may have accessed each message. For example, the example in table 302d can indicate that the customer service representative 110i with CSR ID 320 of value 5 may have not accessed a message with message UID 318 of value 81 yet and/or has not assigned any transaction ID 312 values to it, whereas message UID 128 of customer service representative 110j with CSR ID 320 value of 6 may have received an escalated copy of that same message into his mailbox (message UID 318 with a value of 128) and may have assigned a transaction ID 312 with a value of B597Y to that escalated instance of that same message. As shown for two messages with message UID 318 with values of 81 in Table 302d, it is possible that different messages in the separate mailboxes of the various customer service representatives 110a-N may have the same Message UID 318.

Figure 4:
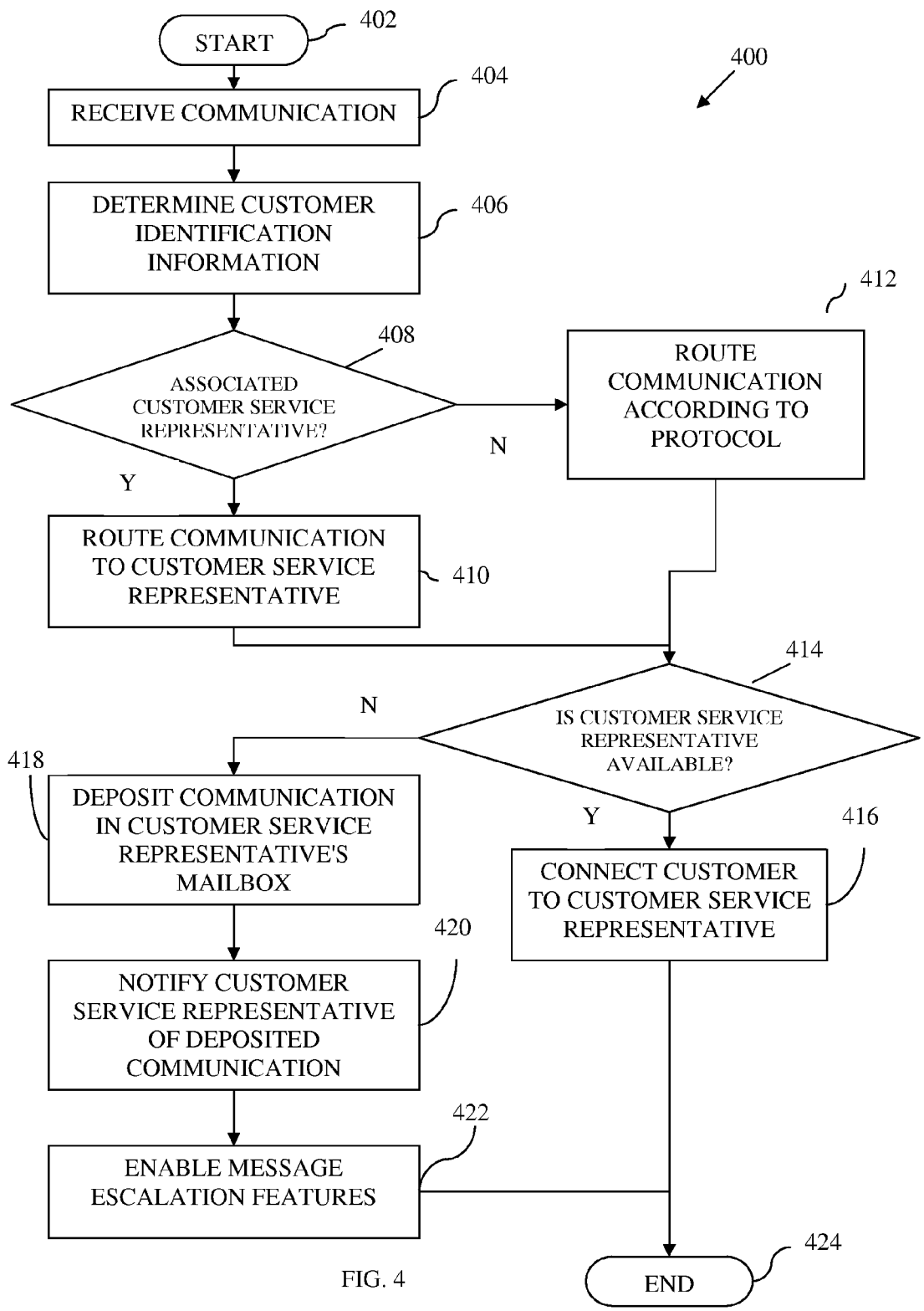
FIG. 4 is a flowchart of a method of message handling in a unified messaging system according to an embodiment of the present disclosure.

FIG. 4 is a flowchart of a method 400 of message handling in a unified messaging system according to an embodiment of the present disclosure. The method 400 may be performed by components of UM call center 102 as discussed below. Specifically, UM controller 112 and/or UM interface 108 may be used to perform the steps of method 400 as appropriate. The method begins at step 402.

In step 404, a communication is received at call center 102. The communication may be a message, telephone call, email, facsimile, short message service (SMS) message, text message, or the like received from a customer 104a-N. In at least one embodiment, the communication is received at UM interface 108. In the same or alternative embodiments, the communication is received and handled further by UM controller 112.

In step 406, user (e.g., customer) identification information is determined. In at least one embodiment, customer identification information is determined by UM interface 108 and/or UM controller 112 based on the communication received in step 404. Customer identification information (e.g., a user identification designation) may be a telephone number, caller ID, email address, Internet Protocol (IP) address, or any other appropriate identifier. For example, the customer identification information may be an incoming source information 304 as shown in FIG. 3. In some cases, no customer identification information can be determined; in these cases, the incoming communication may be identified as "OTHER", as shown in FIG. 3. In an alternative embodiment, customer identification information may be information indicative of the reason the customer 104a-N has contacted UM call center 102.

In step 408, a determination is made as to whether a customer service representative 110a-N is associated with the incoming communication. As described above with respect to FIG. 3, tables 302a-d of UM database 300 may be accessed (e.g., by UM controller 112) and a customer service representative 110a-N may be identified. In this way, a message recipient may be determined by querying one or more recipient databases and/or address books. In other words, UM database 114/300, which includes address book (e.g., contact) information for each customer service representative 110a-N, may be queried to determine which customer service representative 110a-N is to be associated with the incoming communication.

If a customer service representative 110a-N is determined in step 408, the method proceeds to step 410 and the communication is routed to that customer service representative. If no customer service representative 110a-N is identified in step 408, the method proceeds to step 412 and the communication is routed according to a predetermined protocol.

In step 410, the communication received in step 404 is associated with and routed to the UM platform 106 mailbox (Inbox) of a customer service representative 110a-N. That is, a look-up or other function is used to query an address book, a database, or the like to determine if the originator (sender) of the message has been associated with (e.g., assigned to, etc.) a customer service representative and the communication is sent to the mailbox of that customer service representative. The method then proceeds to step 414.

In at least one embodiment, the query accesses a hierarchical or organizational chart, such as organizational chart 308 of table 302b in FIG. 3, to determine the associated customer service representative 110a-N. In the example of FIG. 3, the communication associated with message UID 318 with value of 127 is routed to the customer service representative 110a-N with CSR ID 306 (320) with value of 4.

If no customer service representative 110a-N is identified in step 408, the communication is routed according to a predetermined protocol in step 412. In at least one exemplary embodiment of a predetermined protocol, which can be used when the <<OTHER>> record in table 302a may be missing or otherwise unavailable, UM platform 106 sends the message to any of the customer service representatives 110a-N who may be identified with CSR ID values 306 in table 302a. In yet another embodiment, the communication is assigned to a customer service representative 110a-N according to a predetermined schedule (e.g., next available, lowest workload, position on organizational chart 308, etc.) and the communication is routed to the identified customer service representative 110a-N. The method then proceeds to step 414.

In step 414, a determination is made by one or more communication equipment components such as a telephone network switch (not shown) as to whether the designated customer service representative 110a-N is available. Here, available refers to an ability to communicate with the customer 104a-N in a live or practically live format such as a telephone call, video call, or the like. In at least another embodiment, the UM platform 106 may try to dial out a different phone for the target customer service representative 110i, if the incoming message is a live telephone call. If the customer service representative 110a-N is available, the method proceeds to step 416 and the customer 104a-N associated with the incoming communication is connected to the customer service representative 110i. In at least one embodiment, where the live communications is not established, UM platform 106 allows the customer 104a-N to deposit a message in a mailbox of the customer service representative 110a-N, as appropriate.

If the customer service representative 110a-N is not available, the method proceeds to step 418 and the communication is deposited in a mailbox of the customer service representative 110a-N. In at least one embodiment, the communication is deposited in a mailbox at UM interface 108 that is specifically assigned to the customer service representative determined in step 408 instead of a general (e.g., communal) mailbox. After deposition of the communication, the particular identified customer service representative 110a-N can be notified of the communication in step 420. Notification may be by any appropriate means, such as a page, telephone call, email, email alert, SMS message, voicemail, or the like. In at least one embodiment, this notification would include information indicative of the customer identified in step 406, and may also include the message UID 318. In this way, the customer service representative 110a-N responsible for a particular customer 104a-N is notified that the customer has left a message.

Following notification in step 420, message escalation features are enabled in step 422. These message escalation features are discussed further with respect to method 500 of FIG. 5.

Figure 5:
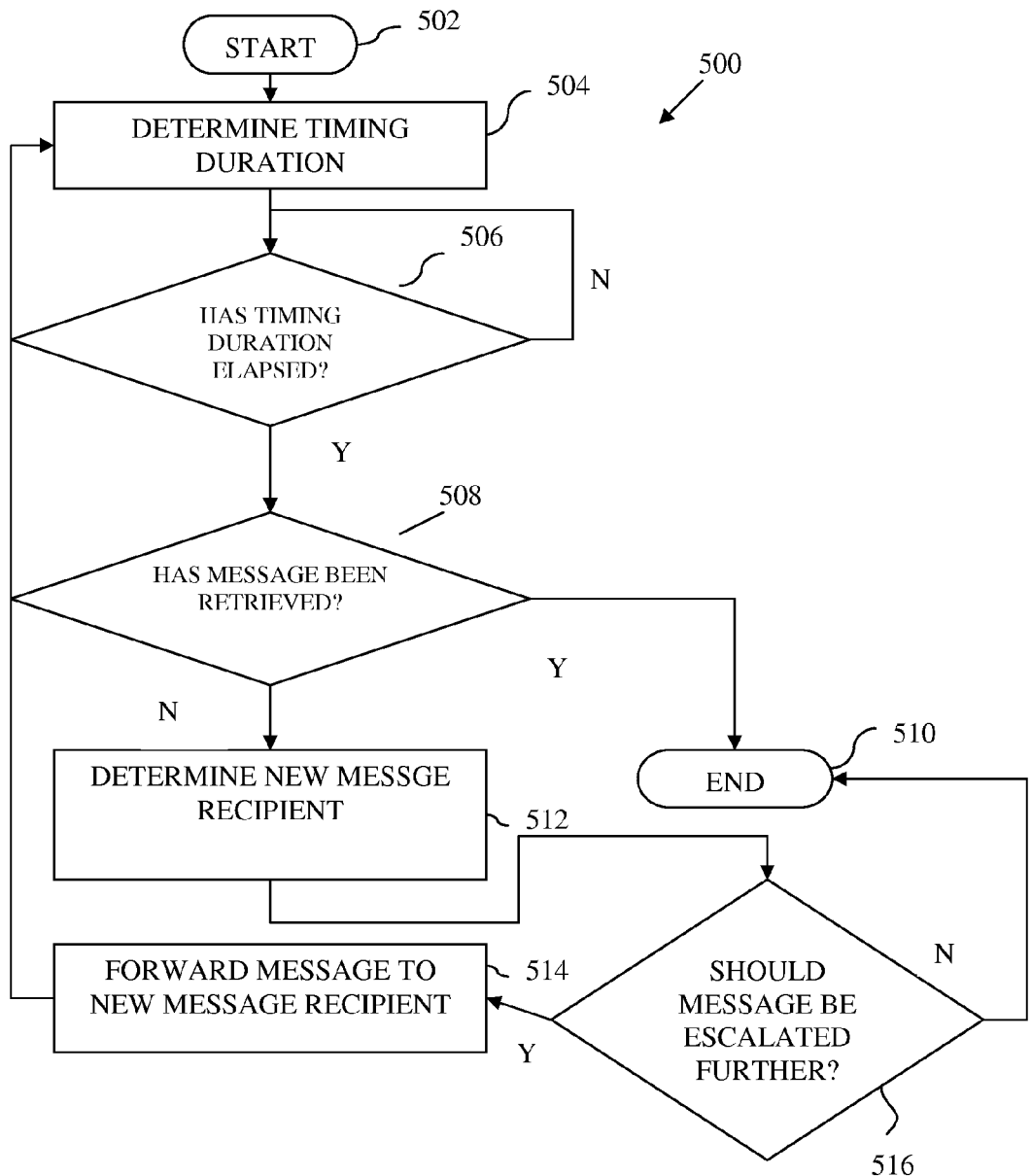
FIG. 5 is a flowchart of a method of message escalation in a unified messaging system according to an embodiment of the present disclosure

FIG. 5 is a flowchart of a method 500 of message escalation in a unified messaging system according to an embodiment of the present disclosure. The method 500 may be performed by components of UM platform 106 as discussed below. Specifically, UM controller 112 and/or UM interface 108 may be used to access UM database 114/300 to perform the steps of method 500 as appropriate. For conciseness of description, the method begins at step 502 and it is assumed that a message has been or will be deposited in a mailbox associated with a customer service representative 110a-N as described above with respect to FIG. 4.

In step 504, a timing duration (delay) is determined. Specifically, the timing duration (delay) may be looked up from a database (e.g., table 302c of UM database 300) or other location (e.g., UM controller 112, UM interface 108, etc.). The timing duration is a time that the deposited message is stored (e.g., held) at a mailbox before an automatic action (e.g., escalation) is triggered. That is, the deposited message is associated with a time period before UM interface 108 and/or UM controller 112 intervenes. As discussed above, the timing duration may be related to a particular level of the organizational chart 308 associated with the customer service representatives 110a-N.

In step 506, a determination is made as to whether the timing duration has elapsed. In at least one embodiment, a timer is activated and run for the timing duration determined in step 504. The timer counts down the timing duration determined in step 504. In at least one embodiment, the timer is activated when the message is deposited in a mailbox. The timer may be a separate component of UM platform 106, may be a part of UM interface 108, may be implemented as logic by UM controller 112, or may be implemented through another method. The determination is continually made until the timing duration has elapsed. The method then proceeds to step 508.

In step 508, a determination is made as to whether the message has been retrieved by the customer service representative 110i who is associated with the UM platform 106 mailbox where the message is stored. In at least one embodiment, it is determined if the customer service representative 110i has read, played, listened to, or otherwise displayed the message. If the message has been retrieved, the method proceeds to step 510 and the method ends.

If the message has not been retrieved, the method proceeds to step 512 and a new message recipient is determined. The new message recipient is determined according to a predetermined structure. In at least one embodiment, the new message recipient is determined based on a hierarchical structure. For example, the organizational chart 308 (table 302b) and table 302c may be used to determine the next higher representative of the organization. The method then proceeds to step 516.

In step 516, a decision is made, based on the determined results of step 512, whether further escalation of the message is necessary. If a predetermined timing value (such as −1) is observed in step 512, no further escalations are indicated, and the method proceeds to end at step 510. Otherwise, the method proceeds to step 514.

The message is then forwarded to the new message recipient in step 514 and the message is deposited in the new message recipient's mailbox. The message may retain the originally associated information (e.g., incoming source information, importance, etc.) and/or be enhanced with additional information (e.g., time elapsed since original message deposition, customer information, information about the original recipient customer service representative 110i, etc.).

In some embodiments, the original message recipient is copied on or otherwise notified of the escalated message so that the original message recipient is made aware of all actions performed related to the incoming message. In the same or alternative embodiments, intermediate escalated messages are deleted upon escalation. That is, optionally, when a message is forwarded for at least a second time, all prior messages—except the original incoming message—are deleted as the message is escalated. In this way, extra intermediate copies of the message are not kept unnecessarily. Only the original CSR and the upper-most CSR would have the original message, and an escalated copy, if this option is implemented. In an alternative embodiment, intermediate messages can be accumulated and forwarded to the intermediate CSRs. In this way, intermediate CSRs will have access to the complete history of a particular transaction.

The method then returns to step 504 and a new timing duration is determined. As discussed above, each customer service representative 110a-N may have a different associated timing duration stored in database 300.

In some embodiments, after determining that a message has not been retrieved in step 508, UM interface 108 or UM controller 112 may access a calendar of the message recipient to determine if the message recipient should be available, is away, is on vacation, etc. In this way, UM platform 106 may determine if further escalation is required. In some embodiments, the timing duration may be reset or modified based on such calendar information.

Figure 6:
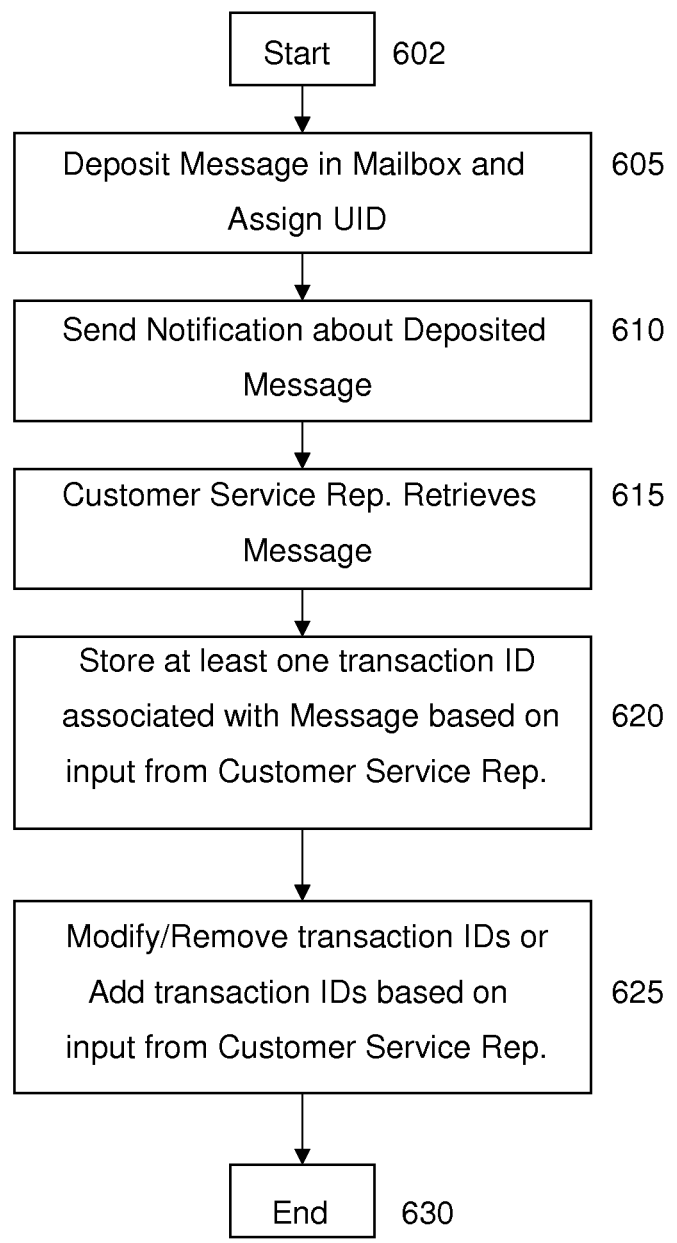
FIG. 6 is a flow chart of a method of associating received messages with transaction IDs in a unified messaging system according to an embodiment of the present disclosure.

As described above, a customer service representative may assign, modify and/or delete zero or more transaction IDs 312 for a message. FIG. 6 is a flowchart illustrating a method 600 of associating transaction IDs to a message according to an embodiment of the present disclosure. For example, the method 600 of FIG. 6 enables a customer service representative 110i to assign at least one transaction ID to a message in the mailbox of the customer service representative 110i and modify or remove any transaction IDs assigned to a message. The method 600 begins at step 602. In step 605, UM platform 106 deposits a message in the mailbox (e.g., per steps 418 and 514 in methods 400 and 500, respectively), and assigns a unique message UID 318 to this new message in that mailbox. The UM platform 106 selects which mailbox to send the message as described above in methods 400 and 500. In step 610, UM platform 106 may send zero or more notifications about the deposited message with message UID 318 to the customer service representative 110i. This notification step is described above in step 420 method 400. In step 615, in response to receiving the notification about the deposited message, the customer service representative 110i retrieves the message from the mail box. This sets the status flag to "retrieve is TRUE". This status flag is read in step 508 of method 500. In step 620, at least one transaction ID 312 may be associated with the message and stored in database 300 based on input received from the customer service representative 110i. This allows the customer service representative to assign one or more transaction IDs 312 to the message. In step 625, existing transaction IDs 312 associated with the message may be modified or removed or new transaction IDs 312 associated with the message are added based on input received from the customer service representative 110i. This allows the customer service representative to modify or remove any existing transaction ID 312 or assign a new transaction ID 312 to a message. The customer service representative can use UM controller 106 to assign, remover, or modify zero or more transaction IDs 312 to a message. The method 600 ends at step 630. It is to be understood that method 600 of FIG. 6 allows a customer service representative 110i to specify or modify transaction IDs 312 associated with a message in the mailbox of the customer service representative 110i at any time.

Though discussed herein as being related to a call center and customer service representatives, one of skill in the art would recognize that the methods and systems described herein could be extended to any appropriate organizational structure. That is, the escalation methods of FIGS. 4 and 5 and the method for assigning transaction IDs to a message of FIG. 6 could be used in any firm, company, network, or the like. In such cases, customer service representatives would be any internal users of the system and the call center would be any network or calling system used by the organization.

The foregoing Detailed Description is to be understood as being in every respect illustrative and exemplary, but not restrictive, and the scope of the general inventive concept disclosed herein is not to be determined from the Detailed Description, but rather from the claims as interpreted according to the full breadth permitted by the patent laws. It is to be understood that the embodiments shown and described herein are only illustrative of the principles of the present general inventive concept and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A method comprising:
receiving an incoming communication comprising a user identification at a unified messaging call center;
determining a first message recipient of the incoming communication based on an association between the first message recipient and the user identification using stored incoming source information comprising user identification information of users who have previously contacted the unified messaging call center;
routing the incoming communication to a first mailbox associated with the first message recipient;
upon determining that the first message recipient has not retrieved the incoming communication from the first mailbox within a first length of time:
generating an enhanced incoming communication by associating original information of the incoming communication with additional information;
routing the enhanced incoming communication to a second mailbox associated with a second message recipient; and
notifying the first message recipient that the incoming communication has been escalated to the second message recipient.

2. The method of claim 1, wherein the original information comprises an indication of an importance of the incoming communication.

3. The method of claim 1, wherein the additional information comprises an amount of time that has elapsed since the first message was deposited in the first mailbox.

4. The method of claim 1, wherein the additional information comprises information about the first message recipient.

5. The method of claim 1, wherein notifying the first message recipient that the incoming communication has been escalated to the second message recipient comprises:
placing a copy of the enhanced incoming communication in the first mailbox of the first message recipient.

6. The method of claim 5, further comprising:
escalating the enhanced incoming communication to a third mailbox of a third message recipient.

7. The method of claim 6, wherein escalating the enhanced incoming communication to the third mailbox comprises:
deleting the enhanced incoming communication from the second mailbox of the second message recipient; and
retaining the incoming communication and the copy of the enhanced incoming communication in the first mailbox of the first message recipient.

8. A non-transitory computer readable medium storing computer program instructions, which, when executed on a processor, cause the processor to perform operations comprising:
receiving an incoming communication comprising a user identification at a unified messaging call center;
determining a first message recipient of the incoming communication based on an association between the first message recipient and the user identification using stored incoming source information comprising user identification information of users who have previously contacted the unified messaging call center;
routing the incoming communication to a first mailbox associated with the first message recipient;
upon determining that the first message recipient has not retrieved the incoming communication from the first mailbox within a first length of time:
generating an enhanced incoming communication by associating original information of the incoming communication with additional information;
routing the enhanced incoming communication to a second mailbox associated with a second message recipient; and
notifying the first recipient that the incoming communication has been escalated to the second message recipient.

9. The non-transitory computer readable medium of claim 8, wherein the original information comprises an indication of an importance of the incoming communication.

10. The non-transitory computer readable medium of claim 8, wherein the additional information comprises an amount of time that has elapsed since the first message was deposited in the first mailbox.

11. The non-transitory computer readable medium of claim 8, wherein the additional information comprises information about the first message recipient.

12. The non-transitory computer readable medium of claim 8, wherein notifying the first message recipient that the incoming communication has been escalated to the second message recipient comprises:
placing a copy of the enhanced incoming communication in the first mailbox of the first message recipient.

13. The non-transitory computer readable medium of claim 12, further comprising:
escalating the enhanced incoming communication to a third mailbox of a third message recipient.

14. The non-transitory computer readable medium of claim 13, wherein escalating the enhanced incoming communication to the third mailbox comprises:
deleting the enhanced incoming communication from the second mailbox of the second message recipient; and
retaining the incoming communication and the copy of the enhanced incoming communication in the first mailbox of the first message recipient.

15. An apparatus comprising:
a processor; and
a memory to store computer program instructions, the computer program instructions when executed on the processor, cause the processor to perform operations comprising:
receiving an incoming communication comprising a user identification at a unified messaging call center;
determining a first message recipient of the incoming communication based on an association between the first message recipient and the user identification using stored incoming source information comprising user identification information of users who have previously contacted the unified messaging call center;
routing the incoming communication to a first mailbox associated with the first message recipient;
upon determining that the first message recipient has not retrieved the incoming communication from the first mailbox within a first length of time:
generating an enhanced incoming communication by associating original information of the incoming communication with additional information;
routing the enhanced incoming communication to a second mailbox associated with a second message recipient; and notifying the first message recipient that the incoming communication has been escalated to the second message recipient.

16. The apparatus of claim 15, wherein the original information comprises an indication of an importance of the incoming communication.

17. The apparatus of claim 15, wherein the additional information comprises an amount of time that has elapsed since the first message was deposited in the first mailbox.

18. The apparatus of claim 15, wherein the additional information comprises information about the first message recipient.

19. The apparatus of claim 15, wherein notifying the first message recipient that the incoming communication has been escalated to the second message recipient comprises:
   placing a copy of the enhanced incoming communication in the first mailbox of the first message recipient.

20. The apparatus of claim 19, further comprising:
   escalating the enhanced incoming communication to a third mailbox of a third message recipient, which comprises:
      deleting the enhanced incoming communication from the second mailbox of the second message recipient; and
      retaining the incoming communication and the copy of the enhanced incoming communication in the first mailbox of the first message recipient.

* * * * *